United States Patent [19]

Robertson, Jr.

[11] 4,250,770
[45] Feb. 17, 1981

[54] HANDLEBAR ASSEMBLY

[76] Inventor: Willard A. Robertson, Jr., 303 Atlantic St., S.E., Washington, D.C. 20032

[21] Appl. No.: 847,147

[22] Filed: Oct. 31, 1977

[51] Int. Cl.² .................... B62K 21/12; A61F 9/00
[52] U.S. Cl. ................................. 74/551.8; 2/17; 74/551.1
[58] Field of Search ............... 74/551.8, 551.1, 551.9; 2/17; 296/78.1

[56] References Cited

U.S. PATENT DOCUMENTS

| 586,678 | 7/1897 | Walsh | 74/551.8 |
| 944,932 | 12/1909 | Abraham | 74/551.8 |
| 1,445,995 | 2/1923 | Carlson | 74/551.8 |
| 1,448,921 | 3/1923 | Ershkowitz | 74/551.8 |
| 1,660,131 | 2/1928 | Lenfers | 74/551.8 X |
| 1,994,837 | 3/1935 | Onge | 74/551.8 |

FOREIGN PATENT DOCUMENTS

| 20343 of 1897 | United Kingdom | 74/551.1 |
| 25682 of 1897 | United Kingdom | 74/551.8 |

Primary Examiner—James C. Yeung
Assistant Examiner—Daniel J. O'Connor

[57] ABSTRACT

The combination of a handlebar for a ten-speed bicycle or the like, which is characterized by a crossbar carried by the bicycle frame and which has downwardly curved sections and rearwardly curved sections that serve as handgrips and an extensible, adjustable supporting bar mounted by clamps to the handgrips for quick and easy attachment and detachment and adjustment to accommodate different spacings between the handgrips to provide support for one or more accessories, such as speedometers, lights, horns and the like.

1 Claim, 1 Drawing Figure

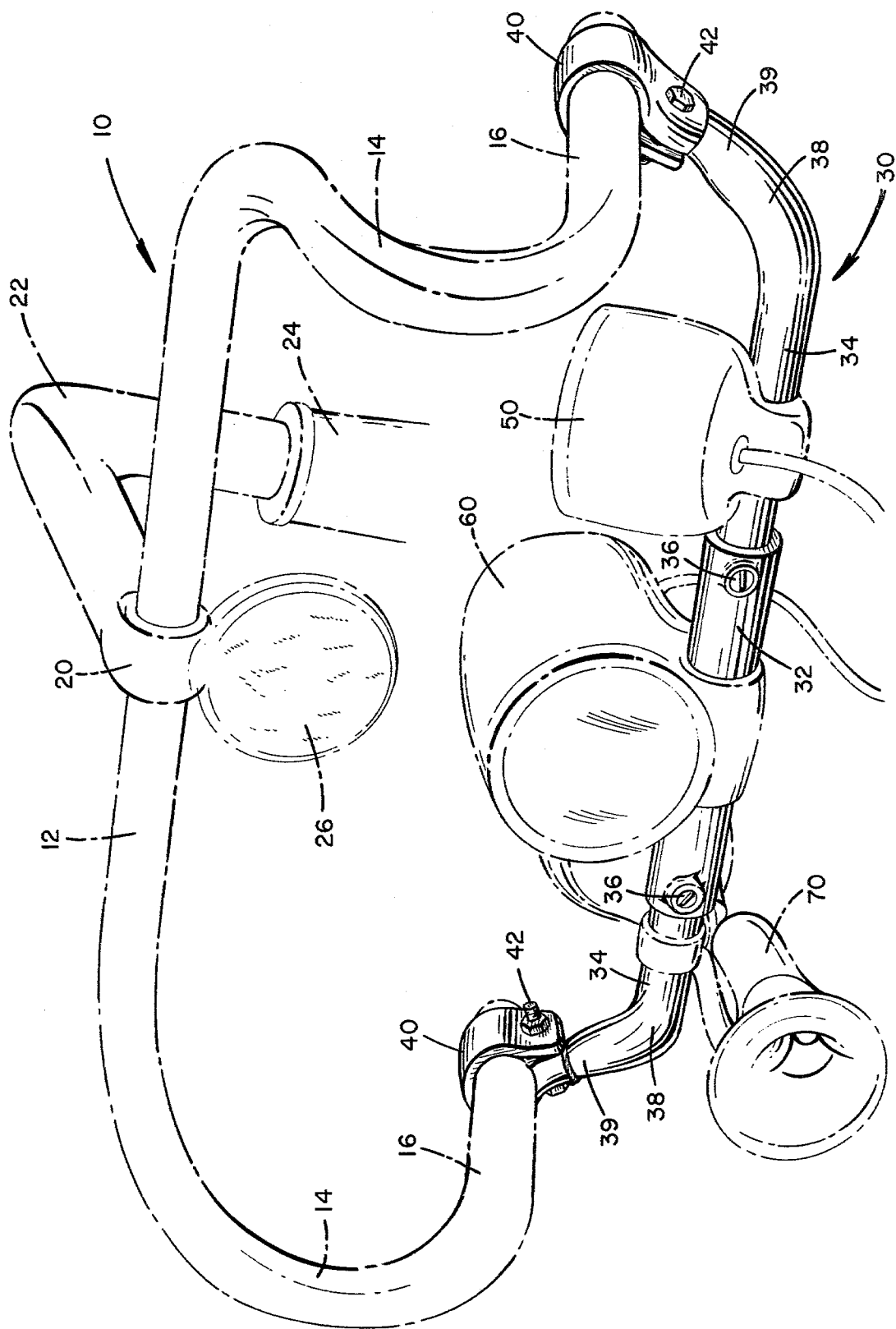

HANDLEBAR ASSEMBLY

The present invention relates to a novel handlebar assembly for bicycles which may easily modify the main handlebar of a typical ten-speed bicycle, and upon which can be readily mounted a variety of accessories.

BACKGROUND OF THE INVENTION

One of the drawbacks of present-day ten-speed bicycles is the inability to mount accessories on the bicycle in a convenient, easy manner. This drawback is overcome by the present invention by the provision of a novel handlebar assembly, including a support bar which is easily and quickly attached to the normal handlebars of a ten-speed bicycle in a quick, efficient manner and which is also adjustable to accommodate different spacings between the hand grips of the handlebars and upon which may be easily and readily mounted a variety of bicycle accessories.

SUMMARY OF THE INVENTION

It is the principal object of the present invention to provide a novel handlebar assembly for a typical ten-speed bicycle comprised of a support bar which may be easily and quickly attached to the handlebar of a typical ten-speed bicycle and which is easily and quickly attachable and detachable as well as adjustable to accommodate different spacings of the handgrips of the handlebar. Bicycle accessories may be easily mounted on or positioned on the support bar.

BRIEF DESCRIPTION OF THE DRAWING

Other and further objects of the present invention will be apparent from the drawing, the sole FIGURE of which depicts the novel handlebar assembly in perspective.

DETAILED DESCRIPTION OF THE PREFERRED EMBODIMENT

Referring now to the drawing in detail, there is shown in the sole FIGURE a typical handlebar of a typical ten-speed bicycle. The handlebar 10 consists of a main crosspiece 12 having formed on either end thereof a downwardly curved section 14 and then, a rearwardly curved section 16, which lies substantially in the horizontal and which serves as the handgrip per se of the bicycle. Brakes, not shown, are usually attached to the curved sections 14 and sometimes, coaster brakes are attached to be actuated from the main crosspiece 12. In use, the sections 16 constitute the handgrips, but sections 14 may be used alternatively for this purpose as well as portions of the crossbar 12.

The handlebar 10 is fixed to the bicycle frame 24 by a coupling or claim 20 formed at the end of an L-shaped rod 22, the depending vertical leg of which is received within and held firmly within the frame 24 of the bicycle. Details for the attachment of the vertical depending portion of L-shaped rod 22 in the frame 24 are entirely conventional and do not form any part of the invention. A reflector 26 is shown attached to the coupling or clamp 20 and constitutes one of the several safety features of a ten-speed bicycle.

Extending between the hand gripping portions 16 of the handlebar 10 is a support structure, generally identified by the reference numeral 30, and consisting of a center cylinder or tube 32 receiving within each end thereof one end of a bent rod 34. Set screws 36 serve to fix adjustably and telescopically the received ends of rods 34 in the cylinder 32. Each of the bent rods 34 defines a bend 38 interconnecting opposite ends of the bent rod 34 at an oblique angle. The upper ends 39 of the bent rod 34 are attached to fittings or clamps 40, which are comprised of loops that fit onto the ends of the gripping sections 16 of the handlebar 10. Nut and bolt assemblies 42 serve to fasten or tighten the fittings or clamps 40 onto the sections 16 in a secure but quickly detachable fashion. It will be understood, however, that whereas fittings or clamps 40 and nut and bolt assemblies 42 have been illustrated for this purpose, any convenient manner or way of quickly attaching and detaching the bent rods 34 to the sections 16 may be used and are contemplated by the present invention.

As illustrated in the sole FIGURE, mounted onto the support bar 30 one sees speedometer 50, a light 60 and a horn 70, by means of conventional couplings, nipples, fittings, clamps or fasteners. The support bar provides an exceptionally good way of mounting bicycle accessories and locates them in a generally protected area below the main crossbar 12 of the handlebar 10 and within the bounds of the downwardly curved and rearwardly curved sections 14 and 16, respectively. The set screws 36 provide the necessary lateral or transverse adjustment to accommodate differences in spacing between the sections 16.

The material of the supporting bar 30 may be metal, plastic or the like, depending upon ease of manufacturing, availability of materials, and requirements for attachment and adjustment.

Although the invention has been shown and described in terms of a preferred embodiment, it will be appreciated that changes and modifications can be made which do not depart from the spirit or scope of the inventive concepts herein taught. Such changes or modifications are deemed to fall within the purview of the invention.

What is claimed is:

1. A handlebar assembly for protectively mounting bicycle accessories such as speedometers, lights, horns and the like, said handlebar assembly comprising handlebar means having a substantially straight crossbar portion, said crossbar portion including a central portion adapted to be retained by a bicycle frame, said crossbar portion terminating in ends adapted to be gripped, each of said ends being formed by a downwardly curved portion and a rearwardly curved portion terminating in a handlegrip portion, in combination with support bar means for supporting one or more of said accessories, said support bar means comprising a substantially straight support bar portion including ends, clamp means, affixed to said ends of said support bar means and adapted for rotational movement about said handlegrip portions, for quick and easy attachment and detachment of the support bar means to the handlegrip portions, and telescoping means for enabling longitudinal adjustment of said straight support bar to accommodate different spacings between the handlegrip portions, said support bar means mounted in combination with the handlebar means to define an area for protecting said mounted accessories, the size of said area being adjustable by rotating said clamp means relative to said handlegrip portions to enable said telescoping means for longitudinal adjustment of said straight support bar.

* * * * *